(12) United States Patent
Gerth

(10) Patent No.: US 7,767,940 B2
(45) Date of Patent: Aug. 3, 2010

(54) DEVICE AND METHOD FOR DRYING ELECTRODE COATING

(75) Inventor: Gregory A. Gerth, Kirtland, OH (US)

(73) Assignee: Lincoln Global, Inc., Santa Fe Springs, CA (US)

(*) Notice: Subject to any disclaimer, the term of this patent is extended or adjusted under 35 U.S.C. 154(b) by 1343 days.

(21) Appl. No.: 11/237,252

(22) Filed: Sep. 29, 2005

(65) Prior Publication Data

US 2007/0068911 A1 Mar. 29, 2007

(51) Int. Cl.
*H05B 6/14* (2006.01)
*H05B 6/16* (2006.01)
*B23K 9/00* (2006.01)

(52) U.S. Cl. .................. 219/637; 219/653; 219/136

(58) Field of Classification Search ............... 219/637, 219/636, 620, 653, 643, 656, 659, 137 R, 219/50–56, 136
See application file for complete search history.

(56) References Cited

U.S. PATENT DOCUMENTS

| 4,577,081 | A | * | 3/1986 | Balzer | 219/654 |
| 4,623,129 | A | * | 11/1986 | Loesch | 266/104 |
| 5,210,928 | A | * | 5/1993 | Seshita et al. | 29/596 |
| 5,238,177 | A | * | 8/1993 | Nakulski et al. | 228/265 |
| 5,821,504 | A | * | 10/1998 | Sprenger et al. | 219/635 |
| 6,365,864 | B1 | * | 4/2002 | Stava | 219/50 |
| 2004/0094538 | A1 | * | 5/2004 | Larive et al. | 219/619 |

* cited by examiner

*Primary Examiner*—Daniel L Robinson
(74) *Attorney, Agent, or Firm*—Hahn Loeser & Parks LLP

(57) ABSTRACT

A device for at least partially drying the outer coating on a stick electrode in the form of a generally straight center welding wire of magnetic metal with an axis and surrounded by an extruded pliant mass with a settable binder. The device comprises a conveyor to transport a succession of the electrodes along a given path, a multi-turn induction heating coil extending along the path and spaced from the moving electrodes and a power source for passing an alternating current through the coil to induce an alternating voltage difference in the wire to cause AC current flow in the wire to heat the wire.

73 Claims, 17 Drawing Sheets

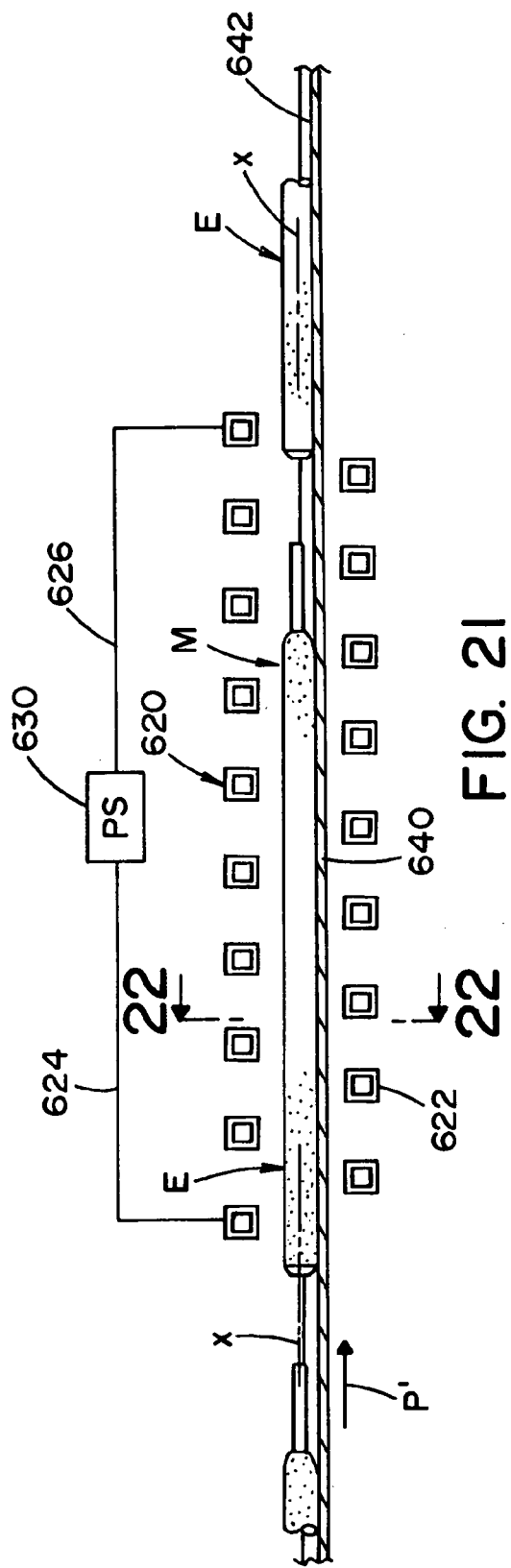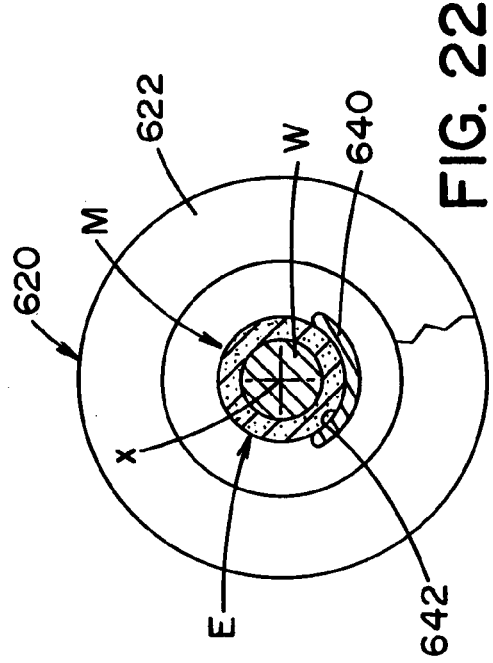

DEVICE AND METHOD FOR DRYING ELECTRODE COATING

The present invention relates to the art of manufacturing stick electrodes for electric arc welding and more particularly to a device and method for drying the outer coating of a stick electrode.

INCORPORATION BY REFERENCE

The invention of the present application involves the unique characteristics of induction heating applied to the drying of the outer coating for stick electrodes. The stick electrode is used in electric arc welding, especially pipe welding, and involves a center metal welding wire with an outer coating. A welding wire heated by electric induction heating for cleaning the outer surface of the wire is known and disclosed in Stava U.S. Pat. No. 6,365,864. This patent is incorporated herein as background information showing induction heating of a continuous welding wire for processing wire.

BACKGROUND OF INVENTION

Stick welding electrodes are manufactured by cutting the welding wire into lengths of less than about 16 inches and extruding a pliable mass with a settable binder around a straight section of welding wire. The coating includes particles, such as particles for fluxing system, particles for arc stabilizing and alloying particles. The binder is normally sodium silicate to create a viscosity allowing extrusion of the mass onto the welding wire. The extruded mass is then heated to set the binder into a generally hard coating on the outer surface of the electrode. The heating or drying operation is performed on electrodes moving by a conveyor in a side-by-side relationship after the strike end has been ground and the hold end has been brushed to expose the wire subsequently used in the welding operation. As the electrodes move transversely, they are heated by a convection furnace to dry the coating. This drying operation is costly and time consuming and requires adjustment and control to assure proper hardening and the desired moisture content of the dry coating. In cellulose type coatings, as commonly used in pipe welding, it is desirable to have a high moisture content in the coating. The moisture of the coating normally starts with about 20%. By using the convection drying process, obtaining high moisture content in a cellulose coating is quite difficult due to the formation of an outer skin which is hardened first in the external drying process. In other electrodes, the moisture content is to be maintained at a level less than 1% and preferably less than 0.5% of the total weight of the electrode. In a cellulose coating, the outer skin effect created by convection heating contributes to the tendency of the electrode to form blisters at the end of the electrode as it is melted during the welding process. Such blisters cause erratic arc directions and uneven formation of the weld metal during the welding process. In this prior art drying, the coating is often hardened before the internal welding wire is thoroughly heated. Since the hardened coating and weld metal have different thermal expansion coefficients, the hardened coating is cracked as the wire temperature increases as the electrode moves through the convection furnace. Conventional dryers harden the coating first and it loses elasticity. The core wire is then heated by conduction through the coating. The coating and wire eventually reach or approach the same temperature, but at significantly different times. Consequently, their different coefficients of thermal expansion causes the coating to be pulled apart and creates minute circumferential cracks in the coating. Circumferential cracking is a particular problem with certain electrodes, such as electrodes with a substantial amount of steel powder in the coating. The cost, difficult controllability, and early hardening of the coating during the existing drying process are disadvantages to which the present invention is directed.

In accordance with the present invention, after the pliable mass of coating material has been extruded over the welding wire and the strike and hold ends have formed, the electrodes are moved in succession through an induction heating device. This device hardens the coating using an induction heating process used by itself or in combination with convection and/or radiant heating, before, after or during the induction heating process. By using the present invention, moisture of the coating is controlled and the drying process is extremely repetitive, clean, highly efficient and environmentally friendly. The drying device and process prevents cracks that contribute to a burn-off and forms no outer hardened skin to cause blistering of the coating as it progresses toward the welding arc. Since there is no outer skin caused by the drying process, cellulose coatings can have increased moisture content in the range of 2-5% or even higher. This improves the porosity of the weld metal and does not cause blisters normally associated with high moisture content in a cellulose coating for a stick electrode. Heating rate and time is accurately controlled using induction heating and which facilitates high moisture content for cellulose coatings. Indeed, the moisture content can be reduced from a high starting content, such as 20% of the coating, to a high level of 2-5% of the electrode coating weight. The use of induction heating raises the temperature of the center welding wire immediately. Any magnetic particles in the coating are also heated. By immediately starting the heating process in the wire, instead of externally of the coating, the coating is dried from the inside toward the outside. This prevents the formation of an outer hard impermeable type of skin as resulting from convection and/or radiant heating as used in the past. The circumferential cracking experienced during conventional drying of the coating and caused by unequal thermal expansion of the coating and core wire is avoided in induction heating. When using induction heating, the wire is heated by inducing a voltage difference in the wire causing current flow through the outer portion of the wire so the wire and coating are heated simultaneously. Induction heating of the core wire is precisely controlled by the power and frequency of the induction heating process. The heating time is accurately controlled, since it can be turned on and off by merely discontinuing the heating current. Convection heating, to the contrary, can not be accurately controlled in this manner. Due to the ability to control the rate and heating time, the heating of the core and coating can be coordinated to prevent any temperature induced circumferential cracking as in the prior drying devices.

Induction heating overcomes the blistering effect experienced with cellulose electrodes. Since the coating during the drying operation does not form an outer impervious skin, the skin can not trap steam in small pockets to form undesired surface blisters. Thus, by using the present invention, a cellulosic or cellulose type of coating can have a high moisture content necessary for porosity without the deleterious effect of surface blistering. This is a substantial advance in the drying process for a coating using cellulose. In the past, a convection furnace caused skin on a cellulose coating because the coating was dried by hot air only. The use of induction heating in combination with convection and/or radiant heating does not create this outer skin because the coating is dried by conductive heating from the inner wire. This internal heating of the welding wire is performed at precisely controlled rates so the drying occurs from the inside of the coating toward the outside of the coating. The coating dries without the formation of moisture barriers that lead to blistering. Consequently, the cellulosic electrode coating can have moisture contents higher than possible when using conventional convection drying procedures.

In accordance with the present invention, there is provided a device for drying the outer coating of a stick electrode in the form of a generally straight center welding wire of magnetic metal with an axis and surrounded by extruded, pliant mass with a settable binder. In practice, the binder is normally sodium silicate and the pliant mass includes particles such as particles of a flux system, particles of an arc stabilizer or alloying particles. The novel device comprises a conveyor to transport a succession of the electrodes along a given path, a multi-turn induction heating coil extending along, and spaced from, the moving electrode and a power source for passing an alternating current through the coil to induce alternating voltage differences in the welding wire to cause AC current to flow in the wire to heat the wire. In this manner, the coating is heated from the wire toward the outside, instead of from the outside toward the wire. In some embodiments of the invention, the coil encircles the path and defines a passageway for the moving electrodes. In other embodiments, the coil is on one side of the path or a coil section is on each side of the path. In the preferred embodiment, the electrodes are transported transversely in side-by-side relationship and, thus, the path is perpendicular to the axes of the moving electrodes. In accordance with an aspect of the invention, the power source has an output frequency in the general range of 50-5,000 hertz and a power of over 5 kW total, from all of the induction heater power sources combined.

In accordance with an aspect of the invention, a convection or radiant heater surrounds the moving path of the electrodes to heat the coating by convection or radiation. The convection or radiation heating device can be before the induction heating coil, after the induction heating coil or coextensive with the induction heating coil. Thus, the convection or radiation heating is supplemental to heating of the wire by induction heating. The spacing or gap between the coil and the center wire is selected using standard induction heating technology; however, it is generally less than about 1.0 inches. This gap controls heating created by the flux field caused by the alternating current driving the coils. The field induces a voltage causing heating current in the wire. In practice, the coil has at least four turns and the wire passageway is at least 16 inches wide. If the invention is performed by a pancake type induction heating coil with the coil on one side of the path, the coil has a transverse width of at least about 16 inches. The wire "passageway" is merely a location below or above the pancake induction heating coil. The induction heating coil is driven by a power source that delivers at least about 5 kW to the coil. 10 kW minimum power level is reasonable for all but cellulosic electrodes. The minimum power is not a feature of the invention and involves all power from the induction heater power source combined. The residence time associated with induction heating is controlled by the speed of the electrodes moving through or past the induction heating coil.

In accordance with still a further aspect of the invention, there are two induction heating coils extending along the path. These coils are at least partially coterminous. A first power source drives the first coil and a second power source drives the second coil, so one of the induction heating coils is spaced from the wire and has a frequency and power to inductively heat the wire. The second coil surrounds the moving electrode and has a frequency and power for inducing current flow in the individual magnetic particles of the coating. Using this aspect of the invention, the wire itself is heated inductively and causes conduction heating of the outer coating. At the same time, each of the individual alloying particles is inductively heated to provide an internal heating source for the coating itself. The heating is still from the inside toward the outside to prevent a skin being developed on the outer surface of the moving electrodes.

Another aspect of the present invention is the provision of a method of at least partially drying the outer coating of a stick electrode in the form of a generally straight welding wire of magnetic metal with an axis and surrounded by an extruded, pliable mass with a settable binder. The invention involves moving the electrodes in succession along a given path, inductively heating the wire with a current having a given frequency and continuing the heating until the coating is generally hardened by heating from the inside out. This method is performed by the device forming the primary aspects of the present invention. The term "dried" or "drying" as it relates to induction heating includes the concept of partially drying.

The primary object of the present invention is the provision of a device and method for drying the outer coating of a stick electrode, which device and method inductively heats the center wire for heating the coating from the inside out to dry the coating.

Another object of the present invention is the provision of a device and method, as defined above, which device and method allows control of the moisture in the coating and prevents minute cracks in the coating during the drying process.

Still a further object of the present invention is the provision of a device and method, as defined above, which device and method allows control of the rate and time of heating and does not produce an outer skin, especially on cellulose type coatings.

A further object of the present invention is the provision of an apparatus and method, as defined above, which apparatus and method controls the moisture of the coating, is repetitive, is clean, is efficient and is environmentally friendly.

These and other objects and advantages will become apparent from the following description taken together with the accompanying drawings.

BRIEF DESCRIPTION OF DRAWINGS

FIG. 21 is a side cross-sectional view of another embodiment of the present invention wherein successive electrodes are moved axially instead of radially; and, FIG. 22 is an enlarged cross-sectional view taken generally along line 22-22 of FIG. 21.

PREFERRED EMBODIMENT

Figure 1:
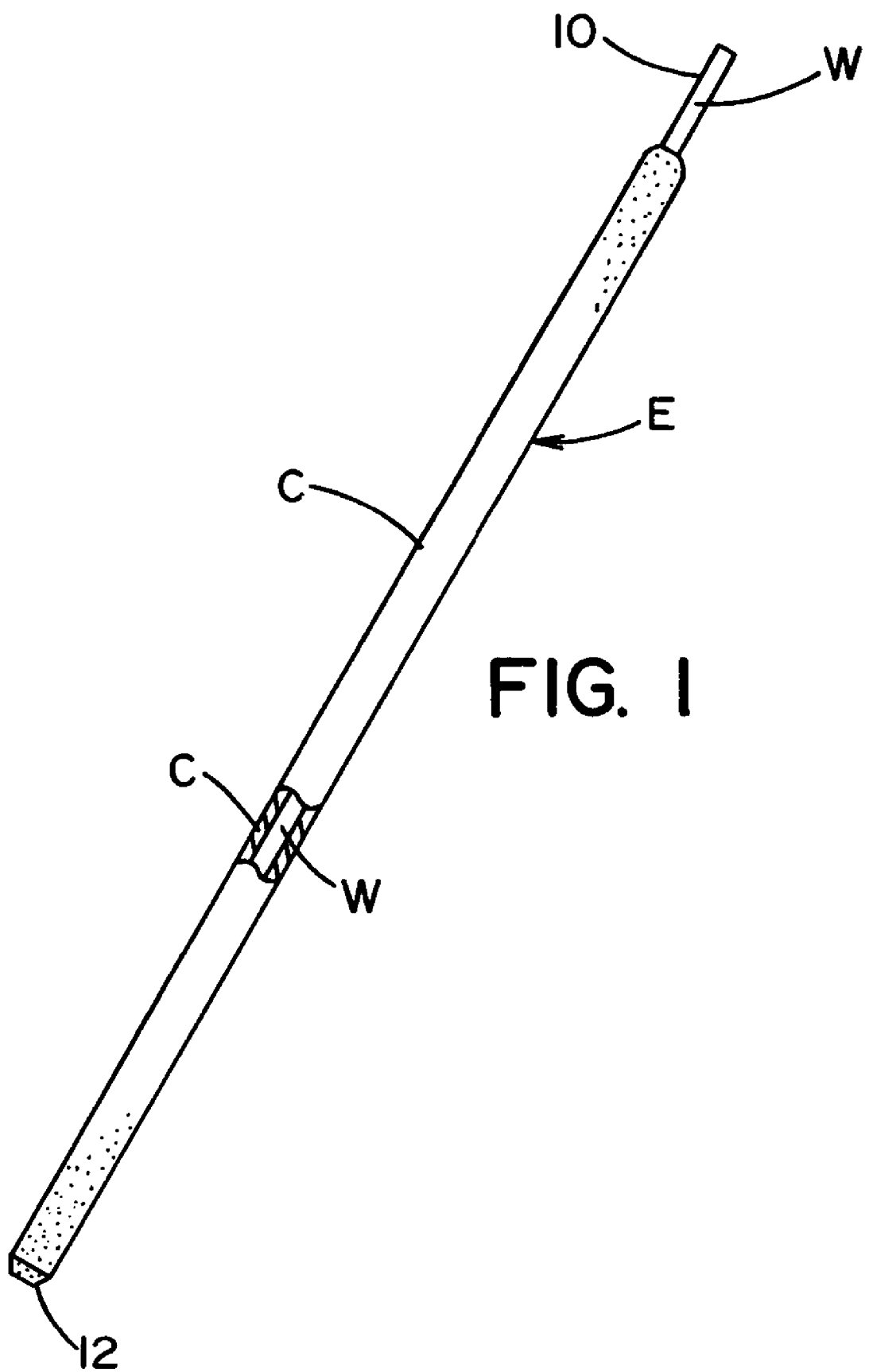
FIG. 1 is a pictorial view of a stick electrode dried in accordance with the present invention.

As shown in FIG. 1, electrode E has a hardened coating C around an elongated wire W to form a stick electrode with hold end 10, where the coating is brushed away, and strike end 12, where the coating and wire are ground to a bevel. Coating C is a dried mass of particles, such as fluxing system particles, arc stability particles and alloying particles, held together by a binder, such as sodium silicate. In the manufacturing process, wire W is cut to a length of about 14 inches and coated with a pliable mass subsequently dried into coating C.

Figure 2:
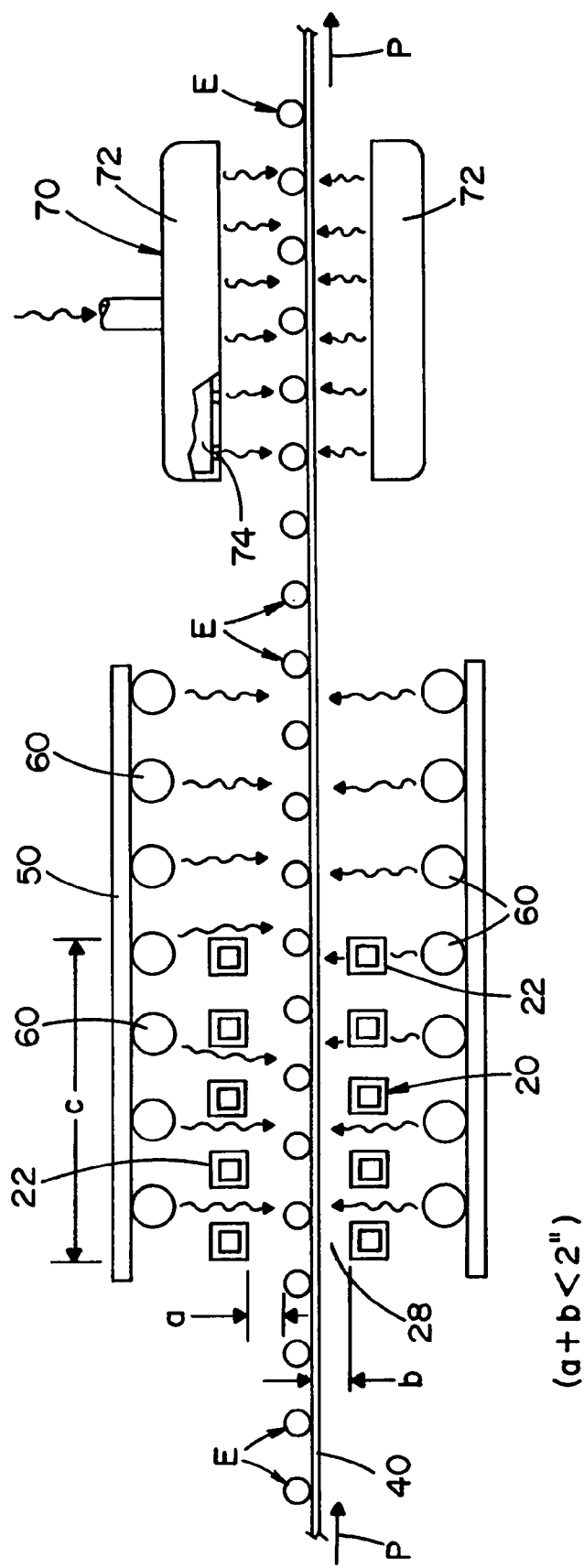
FIG. 2 is a cross-sectional side view schematically illustrating the device and method for drying the coating on the electrode shown in FIG. 1.
Figure 3:
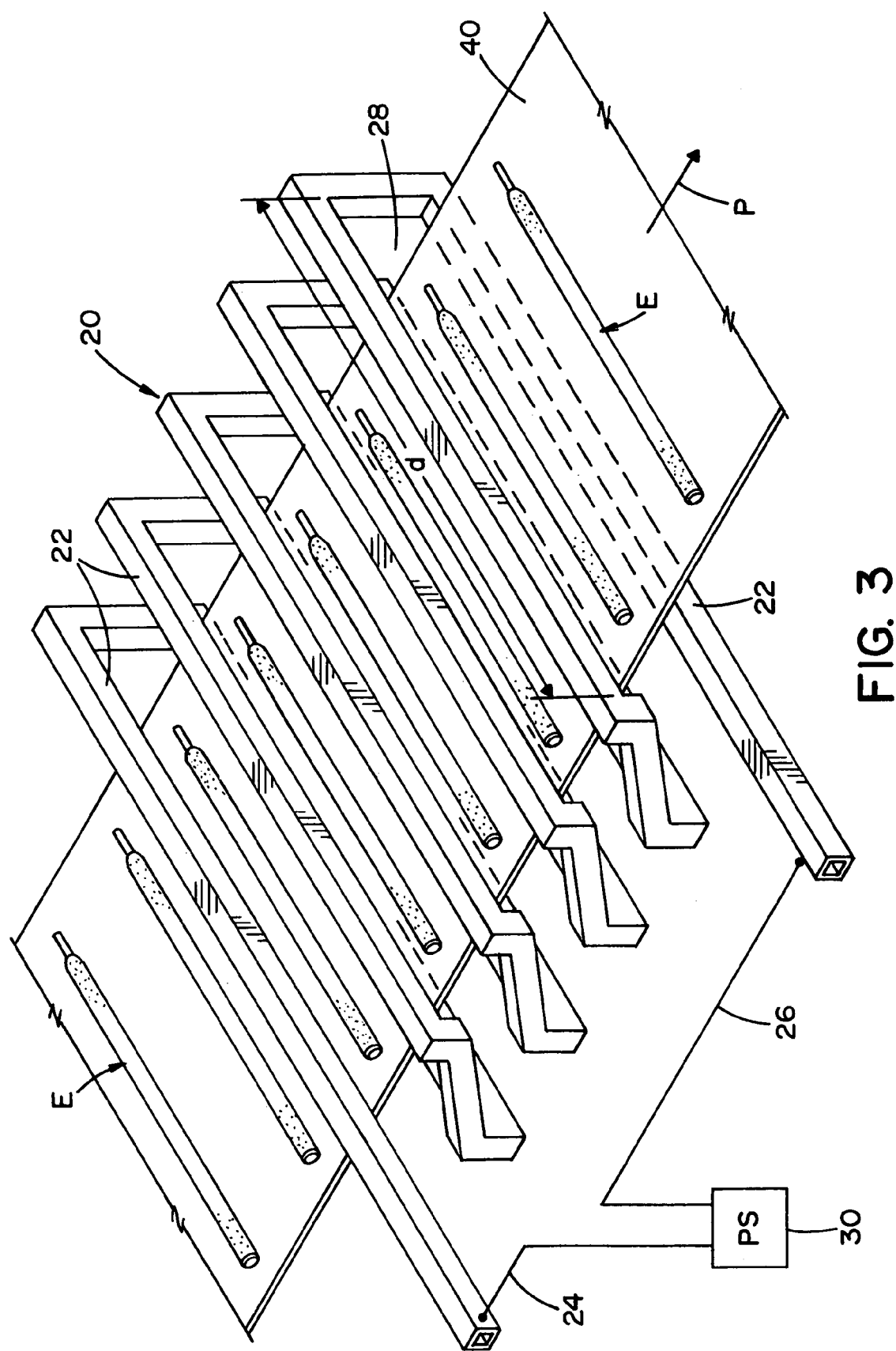
FIG. 3 is a generally pictorial view of the coil used in the preferred embodiment of the present invention as shown in FIG. 2.

The preferred embodiment of the device and method of the present invention is schematically illustrated in FIGS. 2 and 3 and is generally the concept of inductively heating wire W of electrode E as a succession of electrodes moves laterally through an induction heating station, defined by coil 20, along path P. In the preferred embodiment of the invention, the induction heating station includes multi-turn coil 20 having at least four convolutions or turns 22 with input leads 24, 26 connected to the output of power source 30 providing an alternating current with a frequency of 50-5,000 hertz and preferably 100-3,000 hertz. Coil 20 surrounds path P and defines workpiece passageway 28 with a lateral length d which length is about 16 inches when electrode E is about 14 inches long. The upper and lower flat conductors of convolutions 22 are spaced from the electrodes a distance a, b which distances are preferably the same and are less than 1.0 inches. Thus, the gap between the electrodes moving through passageway 28 and the upper and lower conductors of convolutions 22 is less than 1.0 inches. Electrodes E are transported along path P on non-magnetic conveyor 40 moving through the induction heating station or coil, which is surrounded by optional housing or enclosure 50. Such housing accommodates an auxiliary heating source, shown as a radiant heater with elements 60. The radiant heater can be before coil 20, after coil 20 or coterminous with coil 20. This arrangement is illustrated with an overlap distance c. Housing 50 encloses a radiant heater or a conventional convection heater as now used to dry coating C. In FIG. 2, a convection unit, shown as convection heater 70 with a plenum chamber 72, is spaced from coil 20. This unit is sometimes an air cooling device to cool heated and dried coating C. In either a cooling unit or a supplemental heating unit, chamber 72 provides air through outlets 74. In the past, a convection heater such as convection heater 70 was the only drier for coating C. FIG. 2 is illustrative of various permutations and combinations of heating units for drying coating C. The basic concept is heating wire W with induction heating coil 20. In combination with that primary novelty, a radiant heater can be placed before, after and coterminous with coil 20. In a like manner, a convection heater can be placed before, after or coterminous with coil 20. In accordance with the preferred embodiment of the invention only coil 20 is used for drying the pliable mass heated into coating C. Illustration of auxiliary and supplemental drying devices and/or a cooling device evidence the versatility of using the present invention. The coating is heated with conduction from the wire and then outward through the extruded coating. If desired, the coating can be heated from the outside inward by radiation and/or convection while the coating is being heated from the inside out by conduction from the inductively heated wire. All of these combinations are based upon the novel concept of inductively heating the wire.

As is known, the reference depth or heated layer is determined by the frequency of power source 30; therefore, lower frequency heats wire W to a greater depth. Higher frequency reduces the actual induction heated depth and causes the wire to be heated by conduction inwardly, as the coating is heated by conduction outwardly. In this manner, the outside area of the wire is heated by induction heating. Heating from the induction heated outer portion of the wire heats both inwardly of the wire and outward of the coating. In this manner, induction heating provides great versatility, is low cost, is repeatable, is efficient and is environmentally friendly. Induction heating to different depths by changing frequency and power allows accurate and effective drying of the mass forming coating C.

Figure 4:
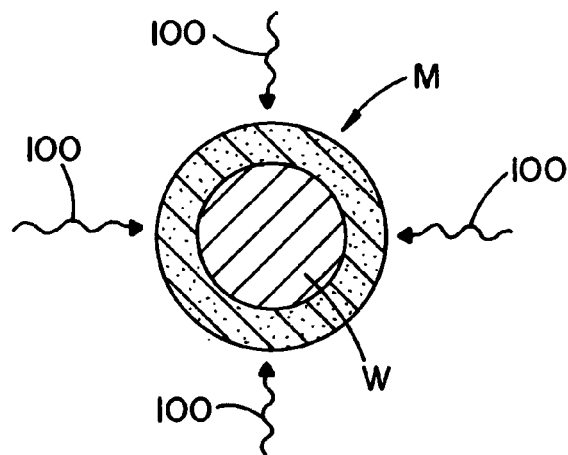
FIGS. 4-8 are schematic views illustrating characteristics of an electrode dried by a prior art device and method.
Figure 5:
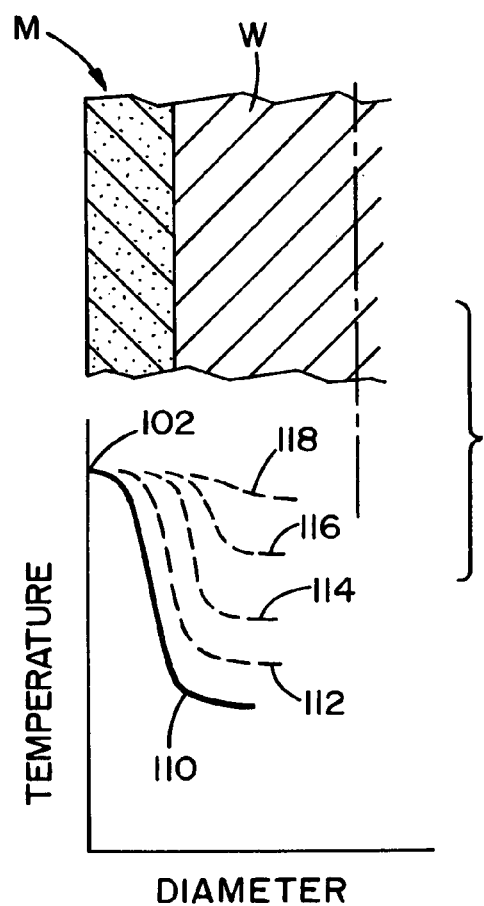
Figure 6:
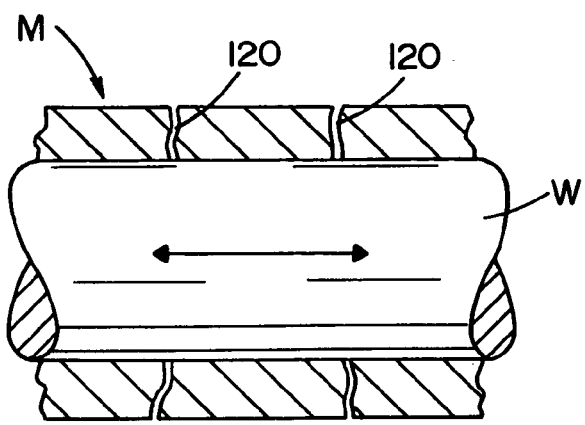
Figure 7:
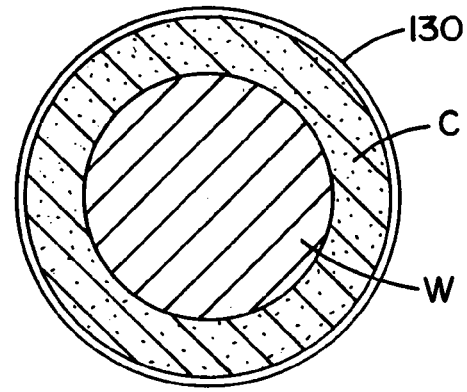
Figure 8:
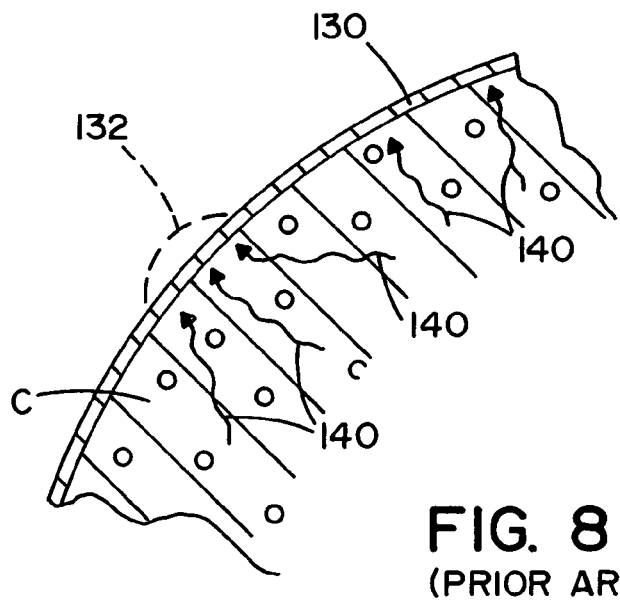

In the prior art, wire W is heated by conduction from the outside of mass M which is heated by convection as indicated by arrows 100 in FIG. 4. The heat profile of the prior art convection heating process is illustrated in FIG. 5 wherein the outer mass M around wire W is heated from the outside inwardly as shown in the lower graph of FIG. 5. Convection heating of the coating causes high temperature 102 at the outer surface of mass M. This temperature remains high and tends to form a skin around the coating during the drying cycle. At first, the heat profile is from outer high temperature 102 to a lower internal temperature as depicted by profile line 110. As the convection heating process continues, convection air maintains a generally stable high temperature 102 at the surface of mass M. As the cycle progresses, the heat profile line shifts, as shown progressively between profiles 112, 114, 116 and 118. This heat stabilization continues until the inner surface of the wire equalizes with high temperature 102. As can be seen, the outer surface of coating C is immediately raised to a high temperature, where it remains during the total convection heating cycle. This heating technique forms an outer skin as discussed in connection with the prior art drying process. As the heat profile progresses between lines 112-118, the temperature on wire W continues to increase while the outer mass M is essentially dried into a hardened body. Since mass M is hardened before wire W reaches the equilibrium temperature, wire W expands after the mass M has been hardened. As shown in FIG. 6, this causes microscopic, circumferential cracks 120 resulting in erratic burn off during the subsequent welding process. Circumferential cracks 120 are caused by unequal thermal expansion of the hardened coating and the subsequently heated wire W. Production of small cracks is a disadvantage of the prior art convection drying process. Convection heating of the mass M also causes a thin outer skin 130 schematically illustrated in FIGS. 7 and 8. This outer skin is generally impervious to gas expelled from the coating during welding. Arc heat at the end of the electrode during the welding process causes formation of outwardly protruding blisters 132 due to steam migrating through the coating as indicated by lines 140 in FIG. 7. This is primarily a problem in coatings having cellulose in the binder. These coatings require a high level of moisture to reduce porosity of the weld bead deposited by the welding process with electrode E so blisters are more likely. In summary, convection heating is not controllable, is costly, is inefficient and sometimes requires substantial efforts for environmental protection. These problems, together with the physical disadvantage of creating cracks 120 and blisters 132, constitute deficiencies solved by using the present invention wherein the wire itself is inductively heated for the drying process.

Figure 9:
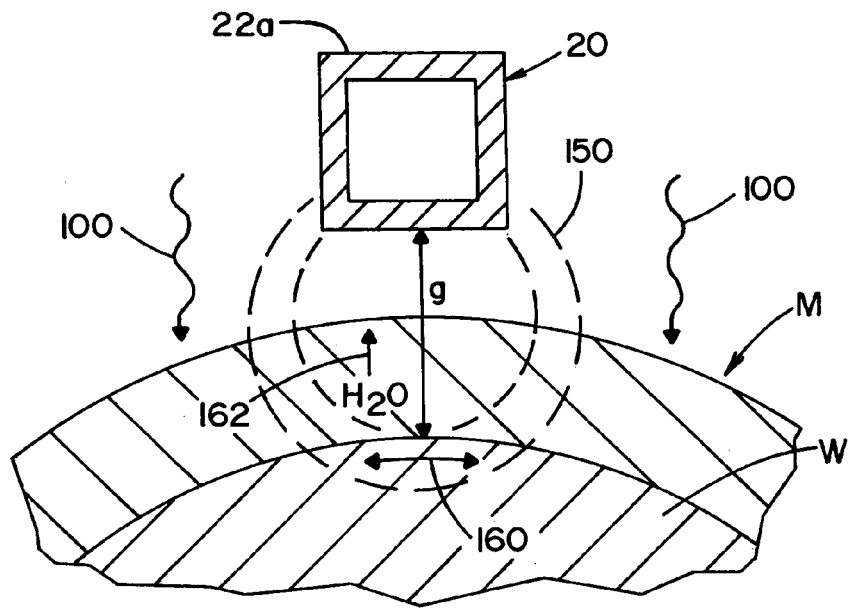
FIG. 9 is an enlarged partial cross-sectional view illustrating the heating concept employed in the present invention.
Figure 10:
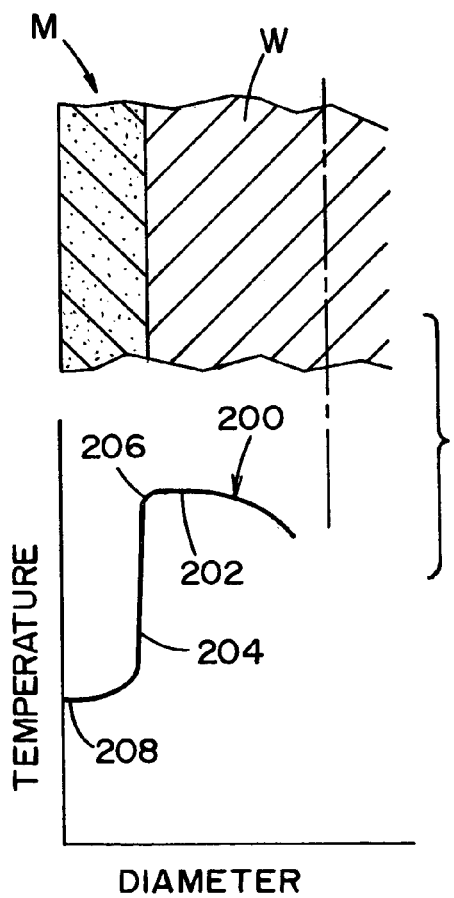
FIG. 10 is a graph of the heat profile compared to the coating and wire of an electrode when heating with induction heating as shown in FIG. 9.

Concepts of the prior art procedure, as set forth in FIGS. 4 and 5, are compared to the inventive apparatus and method by using the illustrations in FIGS. 9 and 10. In FIGS. 9 and 10 mass M is a pliable, extruded mass on wire W with a high moisture level. Conductor 22a of one convolution 22 is illustrated as creating flux field 150 extending into wire W over gap g. Flux field 150 induces a voltage differential in the surface of the wire and causes current flow, represented by arrow 160. The current flow causes $I^2R$ heating to a surface depth determined by the frequency of the alternating current powering conductor 22a. The outer layer of wire W is heated by current 160. The wire heats mass M from the inside to the outside. Outwardly progressive heating drives moisture, as indicated by arrows 162, outwardly through mass M ahead of the advancing temperature increase of the mass. By controlling the heating process, the amount of moisture maintained in mass M is controlled. The preferred coating of electrode E is cellulose. Without using the present invention, the moisture of coating C heated by convection must be substantially less than about 3% by weight of the electrode coating. Higher moisture levels increase the propensity for electrode E to form blisters 132. With convection heating, a skin is formed early so moisture is trapped during drying and will form blisters while welding. The invention avoids the skin effect. Moisture can be driven from the mass M progressively as the mass increases in temperature from the inside out. The moisture can be forced out during welding.

In practice, the moisture in a cellulose type of coating can be maintained at a high level in the general range of 2-5% by weight of electrode. In some instances the cellulose coating can retain upwards of about 6.5% by weight moisture. This substantially decreases the porosity of the deposited weld metal and increases arc force without loss of directional control. Other types of coating require a lower level of moisture, such as less than 1% by weight of electrode in coating C. The low moisture content is controlled by the driving of the moisture from the coating through progressive heating and hardening of the coating from the inside to the outside. Since no skin or hardened outer barrier is caused by the initial hardness of mass M, the amount of moisture retained in the coating can be accurately controlled using the present invention.

Figure 11:
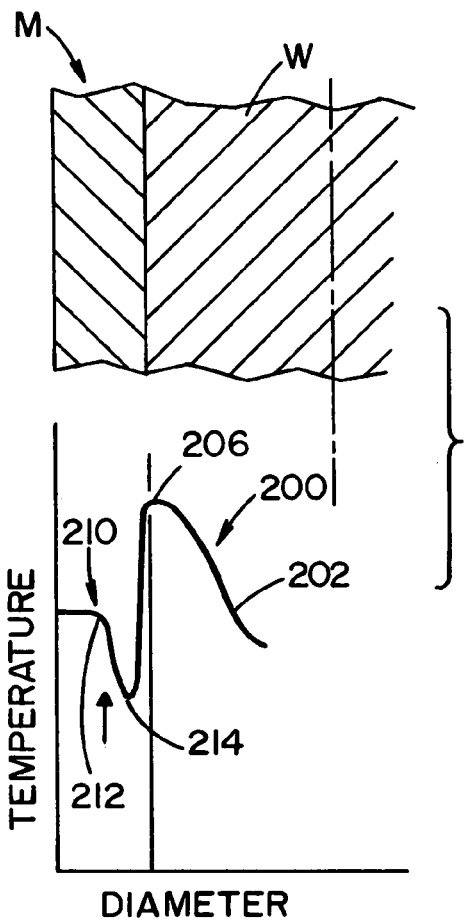
FIG. 11 is a view similar to FIG. 10 illustrating the heat profile when using a combination of induction heating and standard convection heating.
Figure 12:
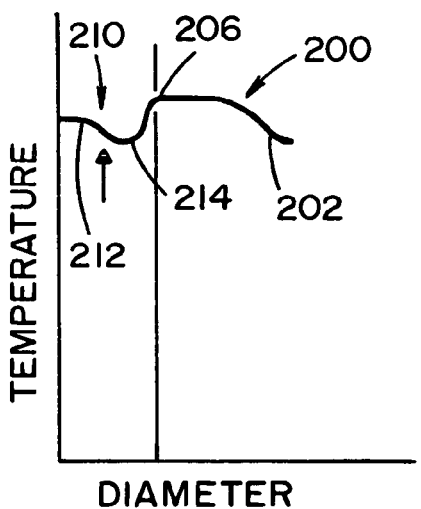
FIG. 12 is a graph similar to the graph in FIG. 11 illustrating equilibrium of the heating process shown in FIG. 11.

The initial heat profile of the present invention is illustrated in FIG. 10 wherein the heat profile line 200 has a high level area shown as section 202 at the outer layer of wire W. A lower level area 204 occurs in mass M. As can be seen, mass M is at a low temperature 208 at the outside of the mass. The progressive induction heating elevates section 204 until it stabilizes with high point 206. FIGS. 9 and 10 illustrate the basic concepts of induction drying of mass M into coating C. As illustrated in FIG. 9, the induction heating drying process can be supplemented by convection heating illustrated by arrows 100. In this instance, the heating profile 200 is modified slightly, as shown in FIGS. 11 and 12. High temperature point 206 is maintained; however, this profile is combined with heat profile 210 having an outer hot section 212 and an inner cooler section 214. Heat profile 210 is caused by convection heating in combination with the novel induction heating process. These two heat profiles 200, 210 attempt to equalize, as shown in FIG. 12. Thus, the present invention is primarily induction heating of the wire as shown by profile 200 in FIGS. 10, 11 and 12. This heating can be supplemented by convection heating, as shown by profile 210 in FIGS. 11 and 12. All methods of heating depend on induction heating of wire W. Other changes in the induction heating profile can be employed without departing from the basic concept of induction heating for hardening coating C.

Figure 13:
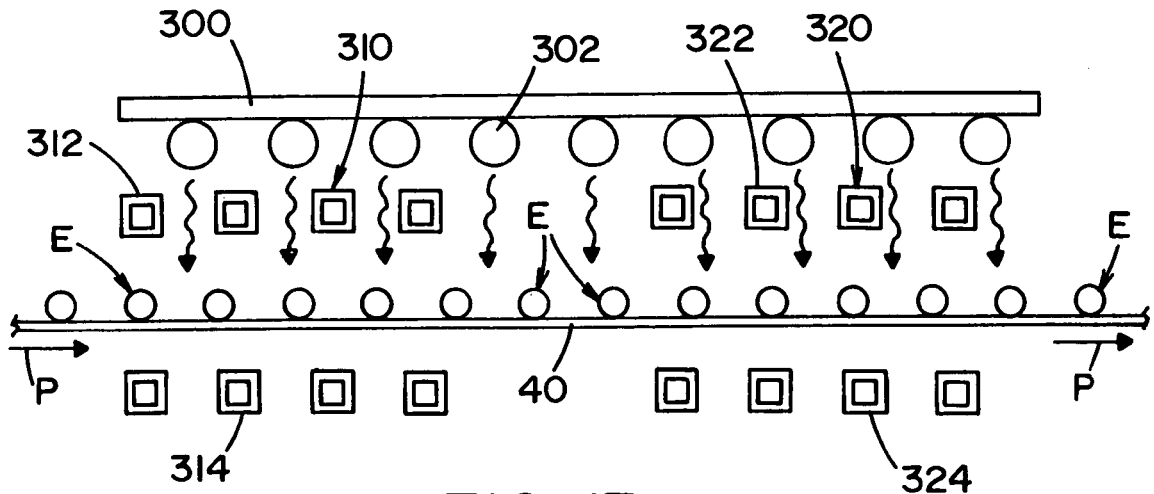
FIG. 13 is a cross-sectional view of a device constructed in accordance with the present invention and including an auxiliary radiant heater.
Figure 14:
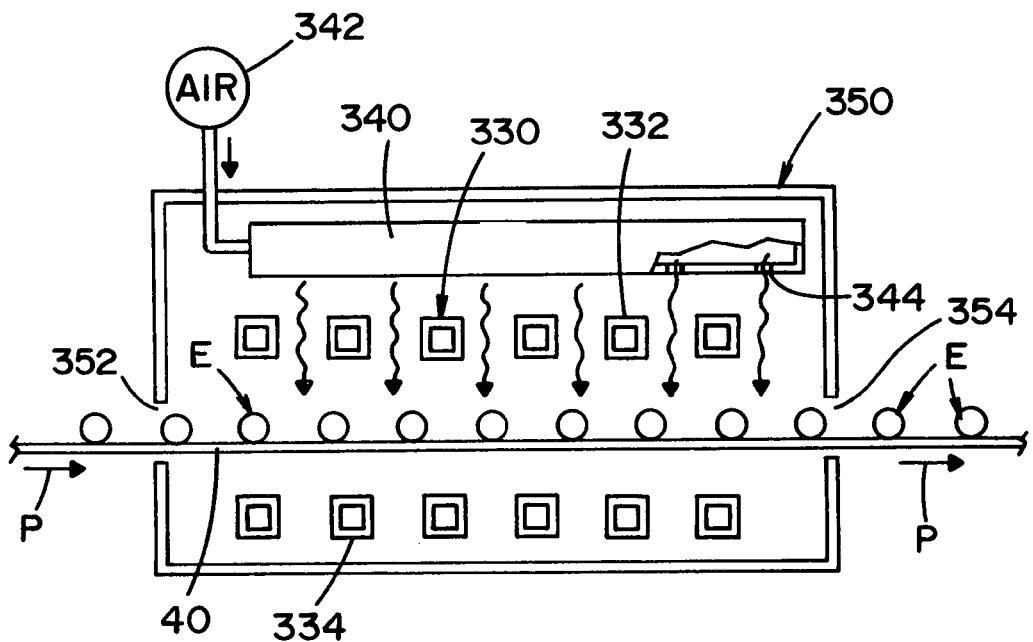
FIG. 14 is a view similar to FIG. 13 showing a combination of induction heating and a convection heater.

Another embodiment of the present invention is illustrated in FIG. 13. Radiant heater 300 with radiant elements 302 heats electrodes E moving on conveyor 40 along path P. For induction heating, a first coil 310 has elongated conductors 312, 314 on opposite sides of the moving electrodes. Second induction heating coil 320 has elongated conductors 322, 324 on opposite sides of electrodes E as they move along path P from the first coil into the second coil. In this manner, each coil can have a different frequency and a different power level. This two stage induction heating station has versatility to select the heating method for the moving electrodes to harden coating C. The drying device and method of FIG. 13 is representative in nature and need not have the radiant heaters. A housing can encircle the two coils to provide convection heating or a protective atmosphere. Convection heating is used in the embodiment of the invention illustrated in FIG. 14. Single induction heating coil 330 has conductors 332, 334 that define individual elongated convolutions, such as convolution 22 shown in FIG. 3. Convection heater 340 includes hot air supply 342 with air outlets 344 to heat the outside of mass M while the inside is heated by induction. This dual heating method is schematically illustrated in FIGS. 11 and 12. To retain the heated convection gas around the moving electrodes, the dryer includes an outer housing 350 with an electrode inlet 352 and an electrode outlet 354. FIGS. 13 and 14 illustrate modifications which can be made in the invention so long as it retains the concept of inductively heating wire W for the basic drying procedure of coating C.

Figure 15:
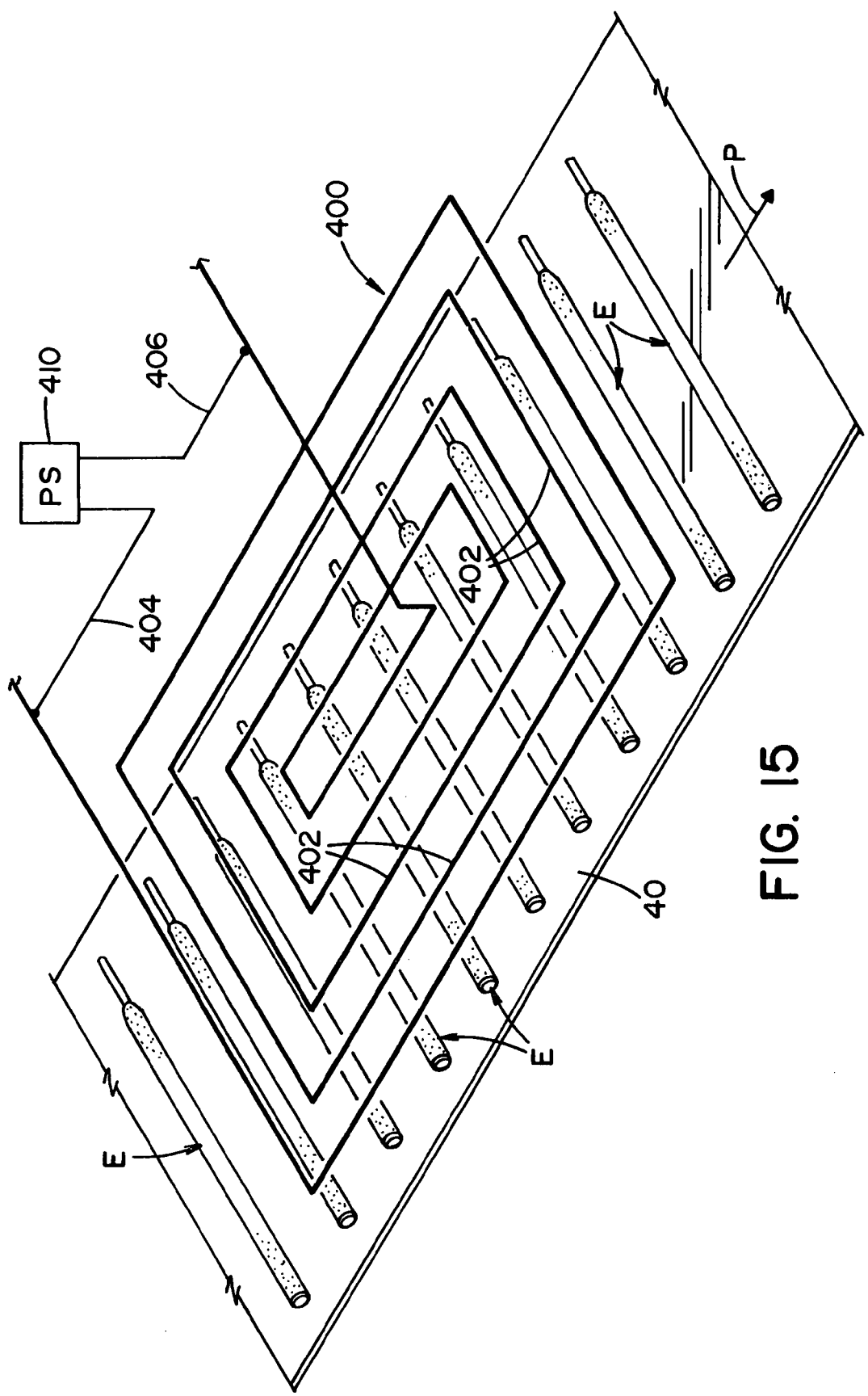
FIG. 15 is a pictorial view of a pancake type coil positioned on one side of the electrode transport path for performing the present invention.
Figure 16:
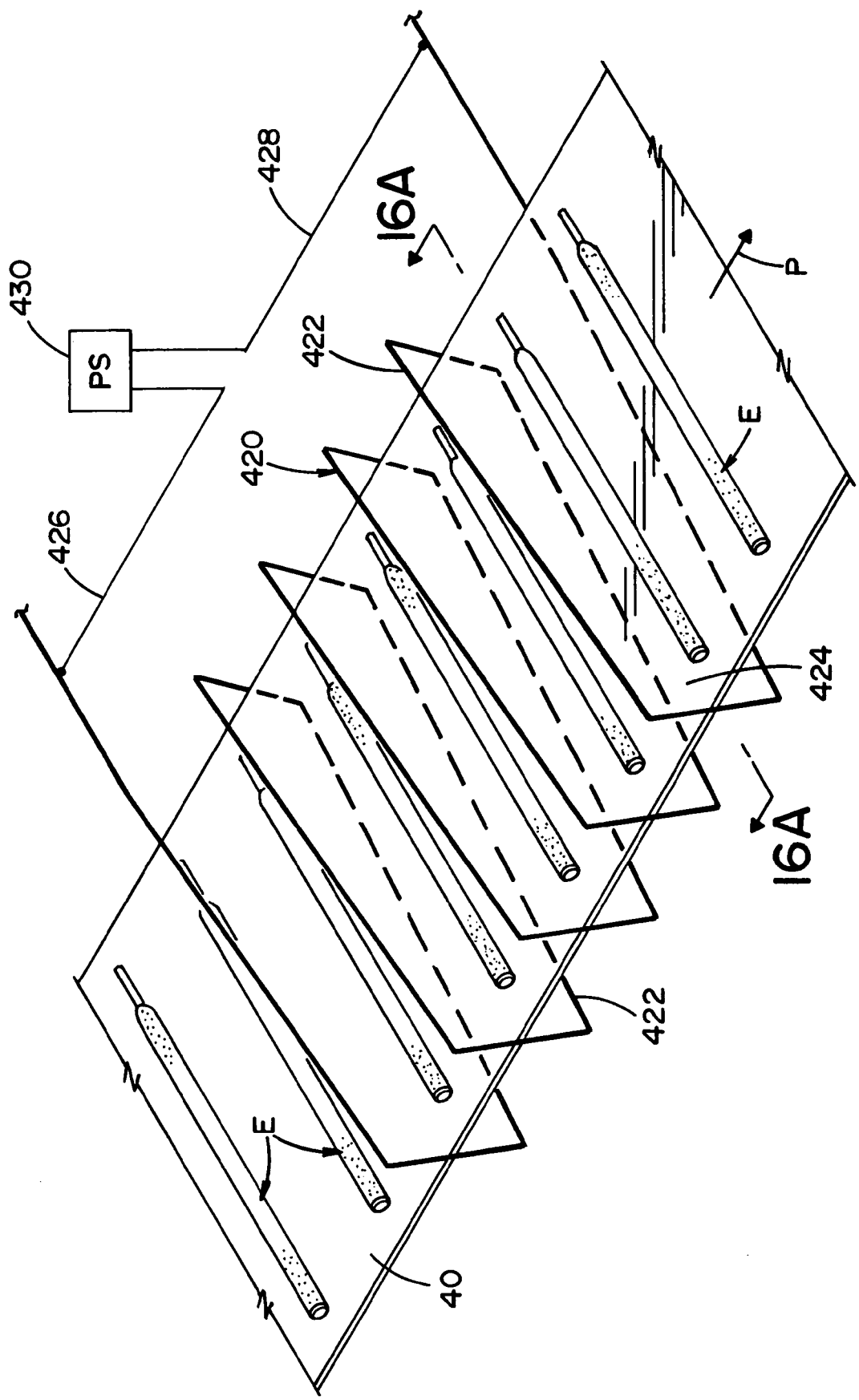
FIG. 16 is a pictorial view of the preferred design of the induction heating coil of the present invention, with electrodes passing through a center passageway.
Figure 16A:
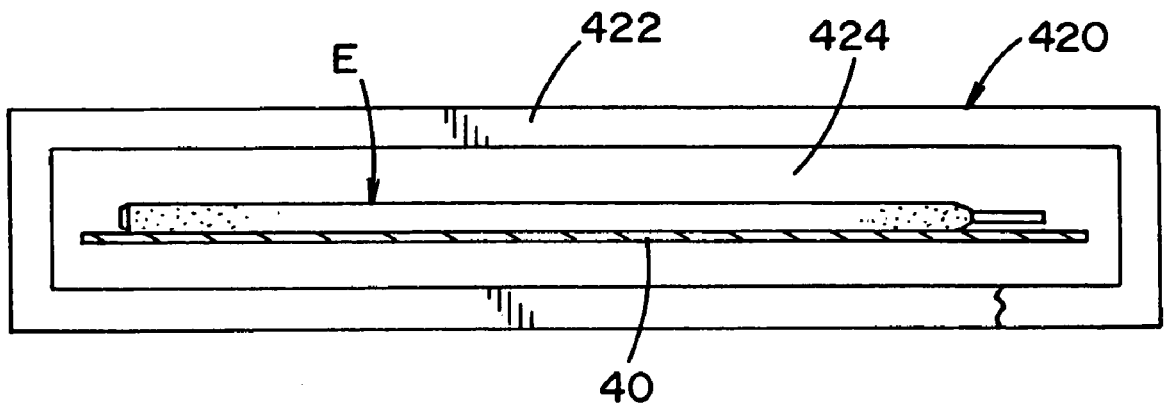
FIG. 16A is an enlarged view taken generally along line 16A-16A of FIG. 16 showing the rectangular workpiece passageway.
Figure 16B:
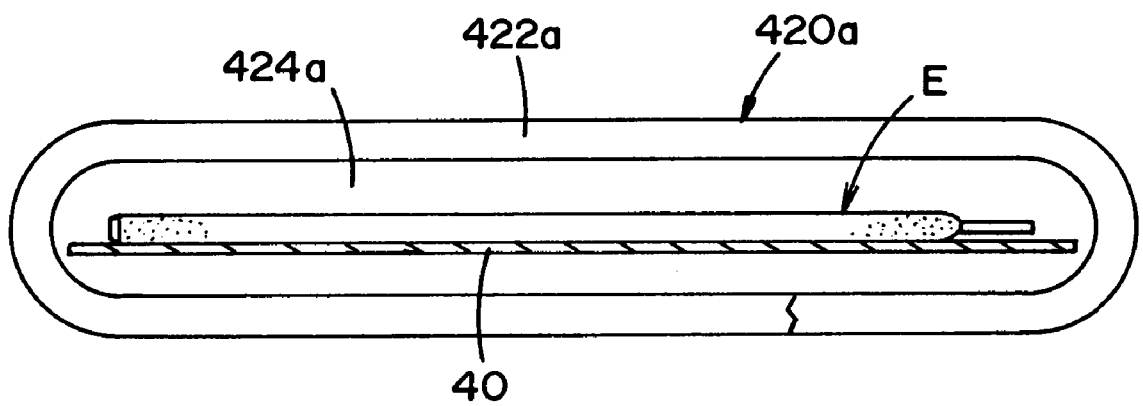
FIG. 16B is a view similar to FIG. 16A illustrating an oblong workpiece passageway for the induction heating coil of FIG. 16.

Another version of the induction drying device is illustrated in FIG. 15 wherein pancake coil 400 has convolutions 402 with leads 404, 406 connected across the output of power source 410. The pancake coil is mounted on one side of path P to create flux fields intercepting wire W of electrodes E as they move under the coil along path P. The preferred configuration for the induction heating coil as shown in FIGS. 3, 13 and 24 is schematically illustrated in FIG. 16 wherein coil 420 has convolutions or turns 422 defining a center rectangular electrode passageway 424 for movement of electrodes E through the passageway and along path P. Leads 426, 428 are output leads of power source 430 to apply an AC current through coil 420. This current causes inductive heating of wires W in the moving electrodes E. FIG. 16A illustrates the preferred rectangular workpiece, or electrode, passageway of coil 420. As an alternative, an oblong passageway 424a can be defined by convolutions or turns 422a of coil 420a, as shown in FIG. 16B.

Figure 17:
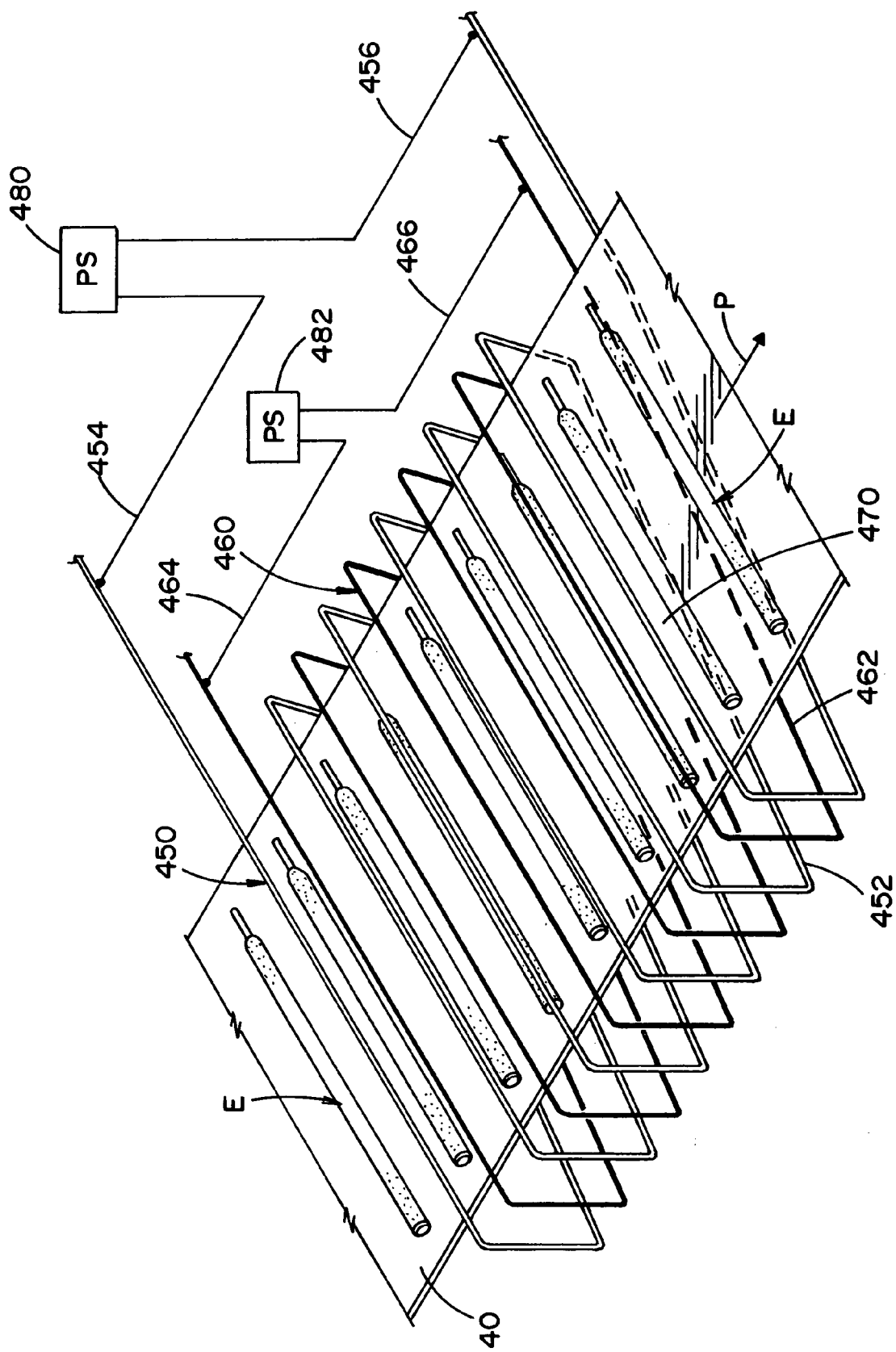
FIG. 17 is a modification of the coil design shown in FIG. 16 using two interleaved or nested induction heating coils with two power sources and a single rectangular passageway for the moving electrode.
Figure 17A:
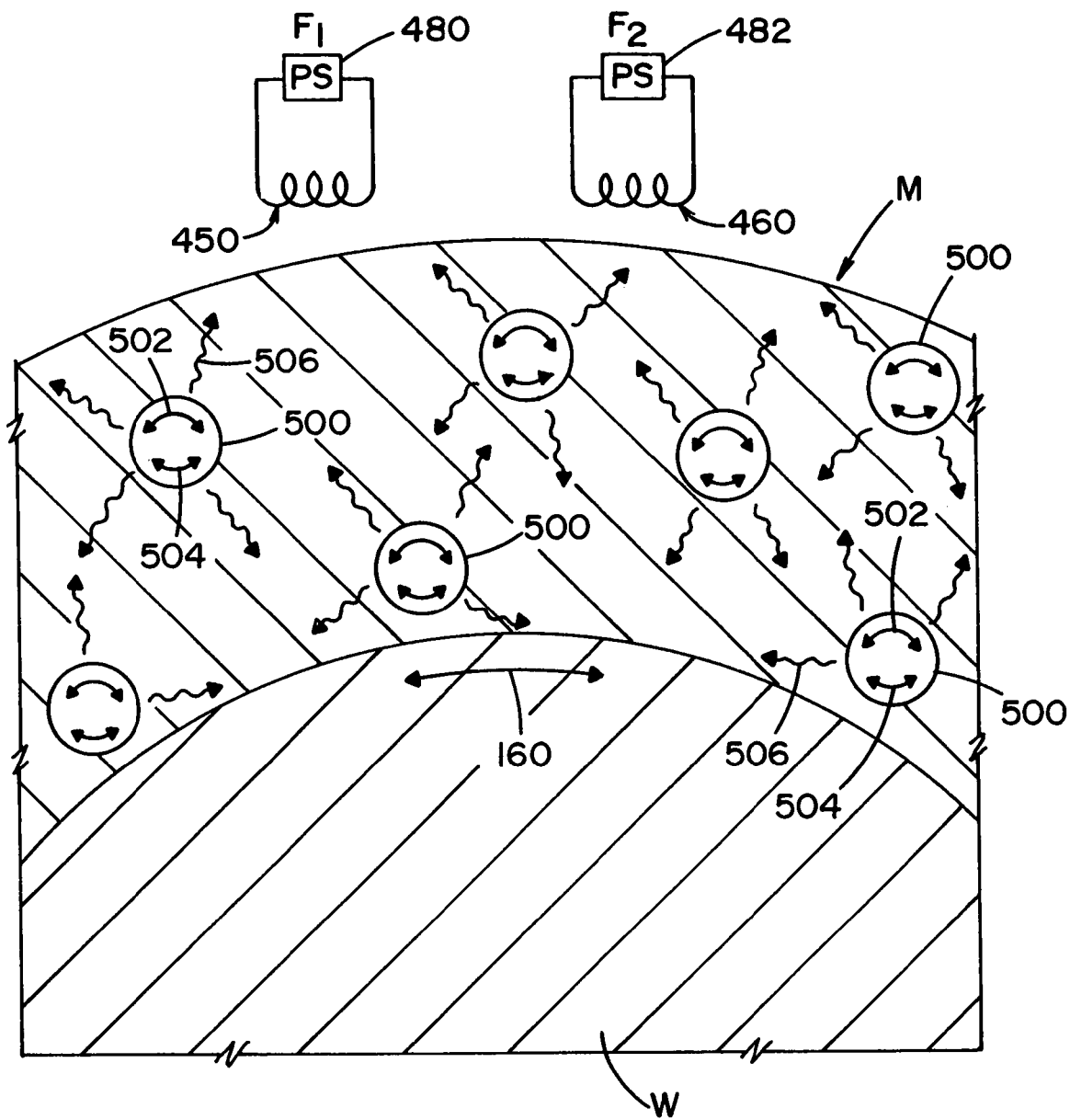
FIG. 17A is an enlarged cross-sectional area of a portion of the electrode being heated by the nested coils illustrated in FIG. 17 which coils are schematically represented at the top of the drawing.

When coating C includes magnetically permeable particles, such as alloying particles, it is possible to inductively heat the individual particles at the same time wire W is inductively heated. The preferred arrangement for accomplishing this objective is described in FIG. 17 where nested coils 450, 460 have turns 452, 462, respectively, defining common rectangular passageway 470 for electrodes E moving along path P. Coil 450 includes leads 454, 456 connected across the output of power source 480. In a like manner, coil 460 has leads 464, 466 connected across the output of power source 482. The frequency, duration and power level of power source 480 is chosen to control the rate of heat input to the particles of the coating while the frequency, duration and power level of power source 482 is chosen to control the rate of heat input to the wire W of the electrodes. As welding electrodes pass through the nested induction heating coils 450, 460, both the area of the wire and the coating itself are inductively heated as schematically illustrated in FIG. 17A. Particles 500 in mass M are inductively heated by both coils 450, 460 to produce current flows shown by arrows 502, 504. Power source 480 is adjusted to cause the primary heating of particles 500 as represented by arrow 502. However, a slight amount of heat will be induced into the particles by coil 460 as indicated by small arrow 504. In this manner, particles 500 constitute a heat source indicated by conduction heat lines 506 to heat mass M, at the same time mass M is being heated by conduction heating from wire W. In this manner, accurate control of the drying process is maintained with two heat sources, each adjusted to the parameters necessary to obtain the desired drying characteristics for mass M as it moves through passageway 470 of coils 450, 460.

Figure 18:
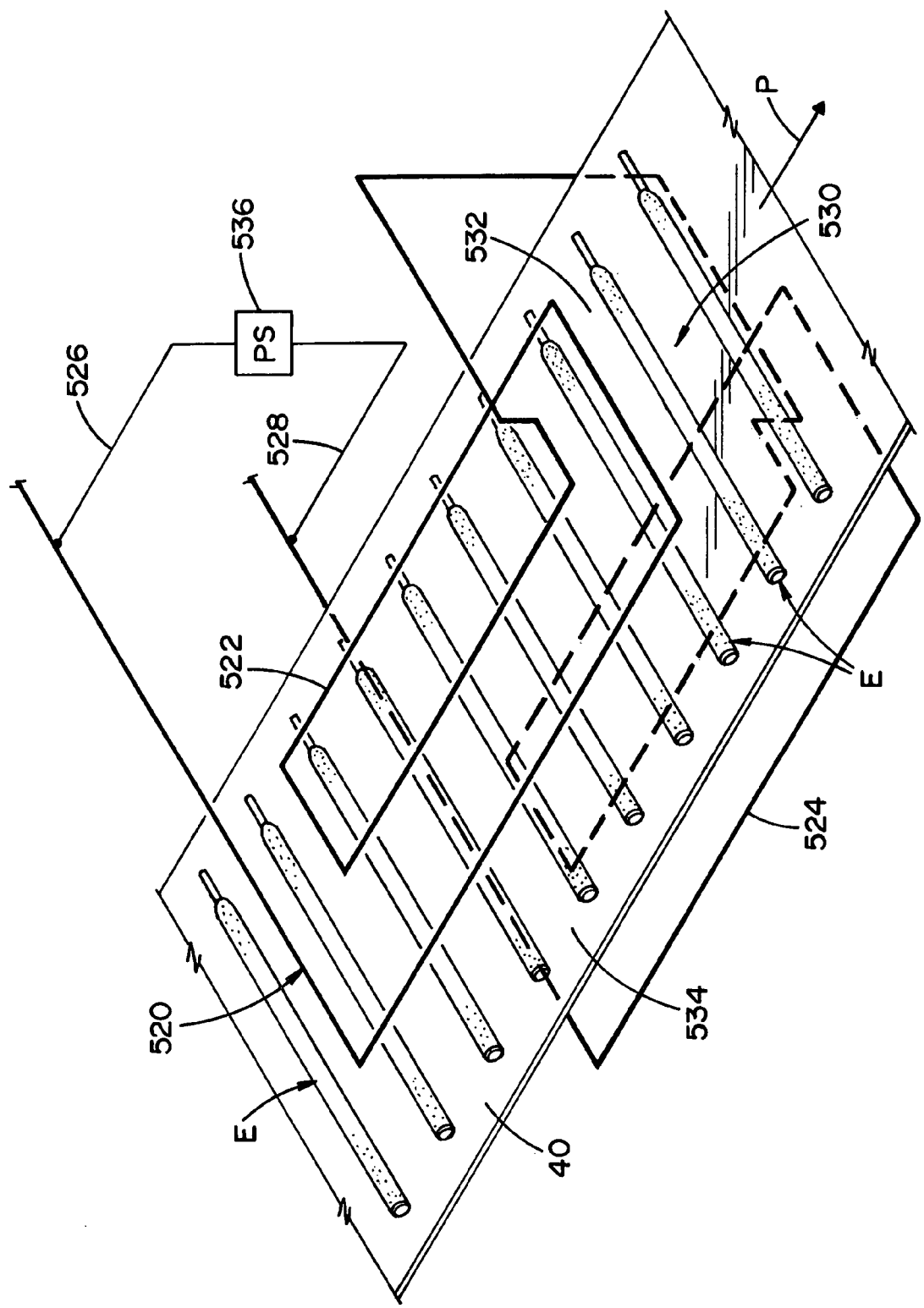
FIG. 18 is a generally pictorial view showing a coil design having two pancake coil sections and driven by a single power source.
Figure 19:
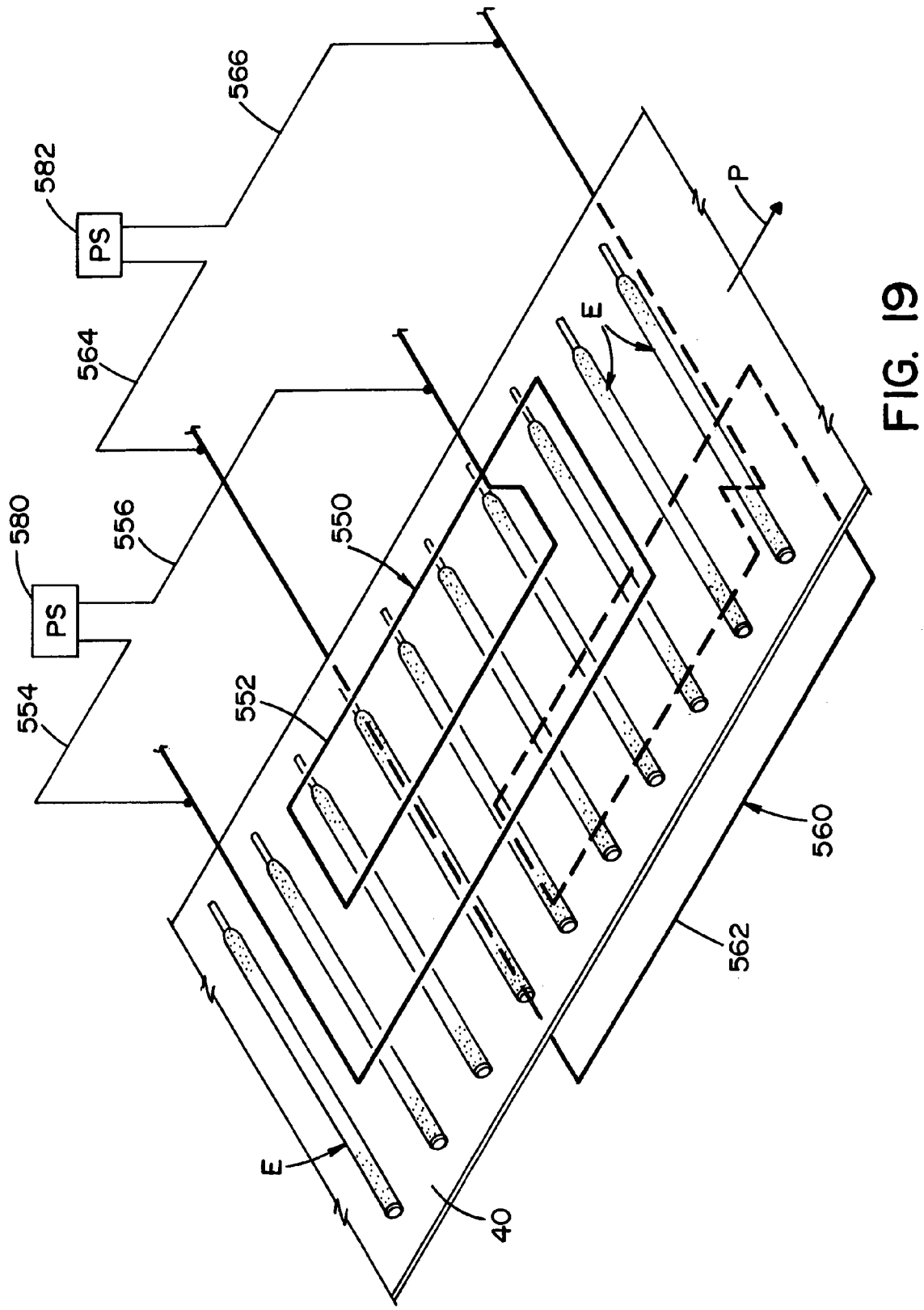
FIG. 19 is a view similar to FIG. 18 where the two pancake coil sections are separate coils driven by separate power sources.

In another embodiment of the invention, coil 520 as shown in FIG. 18 includes pancake section 522 above path P and pancake section 524 below path P. These pancake sections define a workpiece passageway 530, which is essentially rectangular in cross-section, but opened at ends 532, 534. Leads 526, 528 are connected to the output of power source 536 to cause induction heating of wire W from both the top and bottom. Power source 536 has a frequency, duration and power rating to obtain the desired heating of wire W for drying of mass M into a hardened dried coating C. A modification of the concept shown in FIG. 18 is illustrated in FIG. 19 wherein pancake coils 550, 560 have transversely extending turns 552, 562. These turns are similar to the turns defining pancake sections 522, 524 of FIG. 18. They are distinguished from the longitudinal turns in the preferred embodiment generally illustrated in FIG. 16. Leads 554, 556 of coil 550 are connected to the output of power source 580. In a like manner, leads 564, 566 of coil 560 are connected across the output of power source 582. The power sources are adjusted to heat the particles and wire with different heating parameters as schematically illustrated in FIG. 17A. Thus, two pancake sections can be used on opposite sides of the passageway for electrodes E with the first embodiment being driven by a single power source as shown in FIG. 18 and the second embodiment being driven by two separate power sources as shown in FIG. 19.

Figure 20:
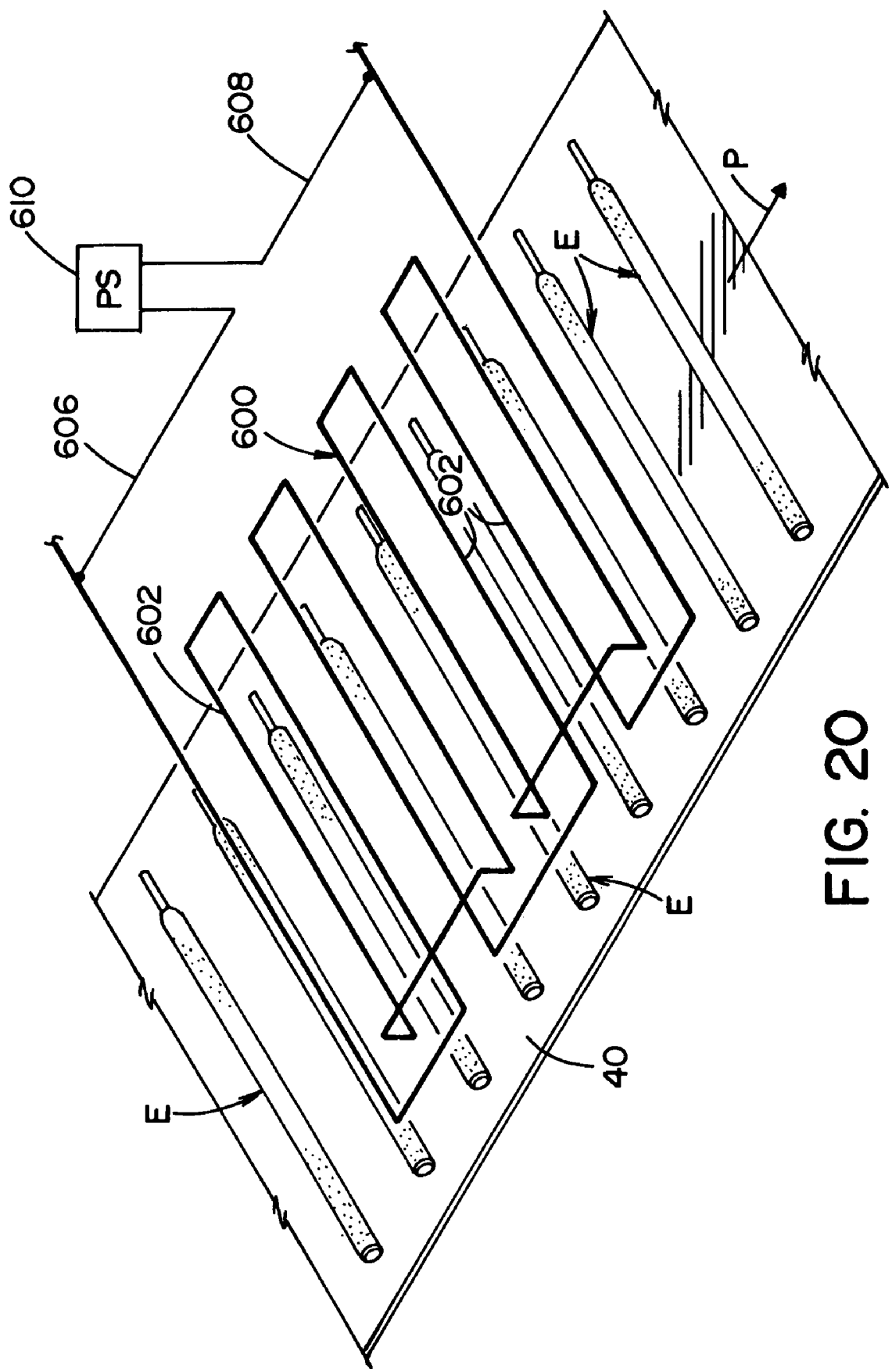
FIG. 20 is a view of a coil design similar to the coil shown in FIG. 18 with longitudinal turns instead of transverse turns.

A further modification of the present invention is illustrated in FIG. 20 wherein coil 600 is spaced on one side of path P and includes vertically staggered coils 602 with different gaps to the wire in the electrodes. Leads 606, 608 are connected to the output of power source 610 to drive coil 600 with an appropriate AC frequency, duration and power level. Electrodes E pass under coil 600 as they travel along path P. In another optional configuration of the modification illustrated in FIG. 20, staggered coil 600 could be located below path P. Thus, coil 600 heats electrodes E from one side or the other in a manner similar to the pancake coil 400 shown in FIG. 15. These are other embodiments of the induction heating device used for drying coating C. Other coil configurations besides those described herein could be employed for the purposes of practicing the invention.

The method and apparatus of the invention heats electrodes E as they move along path P perpendicular to the axes of the electrodes that are side-by-side oriented. In this manner, the standard manufacturing line for electrodes E need not be substantially modified. After the electrode has been provided with the pliable extrudable mass M the ends are processed in accordance with standard manufacturing techniques with existing equipment and then the electrodes are moved along path P in side-by-side relationship as now used for convection drying mass M. The induction heating technique of the invention could be placed at the exit end of the extruder so wires cut to length with extruded mass M are moved axially and successively along path P', as shown in FIG. 21. This path is parallel to the axis x of the individual coated wires which are still called "electrodes." The end-to-end method is shown in FIG. 21. With this orientation, induction heating coil 620 can be a standard coil having circular turns 622 with leads 624, 626 connected to the output terminals of power source 630. As best shown in FIG. 22, the electrodes exiting the extruder are placed upon non-magnetic conveyor 640 illustrated as having an upper nested configuration 642. This non-magnetic conveyor transports electrodes E in succession from the extruder through coil 620 for induction heating to dry mass M using the process so far described. This same drying technique for electrodes moving end-to-end could be used after the extruder and after the hold end and strike end have been processed in accordance with the standard manufacturing procedure. FIGS. 21 and 22 illustrate a further use of the present invention even though the preferred implementation of the invention involves the concept described in connection with FIGS. 1-20.

In one test of the present invention, the non-cellulose stick electrode was heated to 200° F. with a wire reaching 250° F. by induction heating of the electrode. This preheat by induction heating was held for two minutes. Thereafter, further induction heating was used to raise the temperature of the coating to 825° F. while the wire was held at 850-950° F. for eight minutes. The convection device 70 shown in FIG. 2 was converted to a cooling stage so the electrode was cooled for five minutes by convection with ambient temperature air. The result was no cracks and no outer skin on coating C. This procedure was used for an electrode with 0.5% moisture in the resulting coating. The cooling stage is an option in performing the present invention.

Tests have been conducted on cellulosic electrodes. The induction heating process resulted in a coating and wire temperature about 250° F. This temperature was held for a first five minutes cycle, a second ten minutes cycle and a third fifteen minutes cycle without variations in the heating parameters. There were no cracks and there was no skin effect on the electrode. The moisture content was greater than 5% of the electrode coating weight. This electrode was ⅛ inch in diameter. The same test was performed with rutile-based electrodes by holding the coating and wire to 400° F. This higher temperature drove out more moisture. The cellulosic coated electrodes still had no cracks and no impermeable outer skin for subsequent blistering. Thus, the device and method of the present invention did not use convection cooling or convection preheating but merely used induction heating for the purposes of raising the coating and wire to either 250° F. for high moisture and 400° F. for lower moisture. Larger diameter electrodes for low moisture content require a higher heating temperature and do not require any preheating or post cooling. In addition the invention has proven to be an alternative drying technique for many types of coated stick electrodes. Rutile-based coatings have been baked or dried with induction heating coils using an intermediate temperature of about 400° F. to provide a finished product with coating moisture of 0.5 to 2% by weight of the coating. For coating with large amounts of steel powder, induction heating prevents circumferential cracking of the coating. Stainless steel stick electrodes are also capable of induction heating and are heated to about 700° F. to provide coating moisture of less than 0.2% by weight without cracking. The various tests indicate the advantage of using induction heating for drying the outer coating of a stick electrode.

Having thus defined the invention, the following is claimed:

1. A device for at least partially drying the outer coatings of stick electrodes, each stick electrode being in the form of a generally straight center welding wire along an axis of said stick electrode and having a hardened coating being of a dried mass of particles held together by a settable binder, said device comprising:
a conveyor to transport a succession of said stick electrodes along a given path, wherein said stick electrodes are oriented generally parallel to and side-by-side with each other and said path is generally perpendicular to the axes of said stick electrodes;
a multi-turn induction heating coil extending along said path and spaced from said stick electrodes; and
a power source for passing an alternating current through said coil to induce an alternating voltage difference in said wires of said stick electrodes to cause AC current flow in said wires to heat said wires.

2. The device as defined in claim 1, wherein said coil encircles said path and defines a passageway for said electrodes.

3. The device as defined in claim 1, wherein said binder includes sodium silicate.

4. The device as defined in claim 3 wherein said power source has an output frequency in the general range of 50-5,000 hertz.

5. The device as defined in claim 4, wherein said power source has a controller to adjust the frequency to control the heating of said center wire.

6. The device as defined in claim 2, wherein said power source has an output frequency in the general range of 50-5,000 hertz.

7. The device as defined in claim 6, wherein said power source has a controller to adjust the frequency to control the heating of said center wire.

8. The device as defined in claim 1, wherein said power source has an output frequency in the general range of 50-5,000 hertz.

9. The device as defined in claim 8, wherein said power source has a controller to adjust the frequency to control the heating of said center wire.

10. The device as defined in claim 8, wherein said electrode has a core wire diameter in the general range of about 3/32 inch to about 1/4 inch.

11. The device as defined in claim 6, wherein said electrode has a core wire diameter in the general range of about 3/32 inch to about 1/4 inch.

12. The device as defined in claim 4, wherein said electrode has a core wire diameter in the general range of about 3/32 inch to about 1/4 inch.

13. The device as defined in claim 3 wherein said electrode has a core wire diameter in the general range of about 3/32 inch to about 1/4 inch.

14. The device as defined in claim 2, wherein said electrode has a core wire diameter in the general range of about 3/32 inch to about 1/4 inch.

15. The device as defined in claim 1, wherein said electrode has a core wire diameter in the general range of about 3/32 inch to about 1/4 inch.

16. The device as defined in claim 8, wherein the spacing between said coil and said electrode is less than about 1.0 inches.

17. The device as defined in claim 3 wherein the spacing between said coil and said electrode is less than about 1.0 inches.

18. The device as defined in claim 2, wherein the spacing between said coil and said electrode is less than about 1.0 inches.

19. The device as defined in claim 1, wherein the spacing between said coil and said electrode is less than about 1.0 inches.

20. The device as defined in claim 19, wherein said coil has at least 4 turns and has a wire passageway of at least 16 inches.

21. The device as defined in claim 15, wherein said coil has at least 4 turns and has a wire passageway of at least 16 inches.

22. The device as defined in claim 8, wherein said coil has at least 4 turns and has a wire passageway of at least 16 inches.

23. The device as defined in claim 3 wherein said coil has at least 4 turns and has a wire passageway of at least 16 inches.

24. The device as defined in claim 2, wherein said coil has at least 4 turns and has a wire passageway of at least 16 inches.

25. The device as defined in claim 1, wherein said coil has at least 4 turns and has a wire passageway of at least 16 inches.

26. The device as defined in claim 25, wherein said power source delivers at least 5 kW to said coil.

27. The device as defined in claim 19, wherein said power source delivers at least 5 kW to said coil.

28. The device as defined in claim 15, wherein said power source delivers at least 5 kW to said coil.

29. The device as defined in claim 8, wherein said power source delivers at least 5 kW to said coil.

30. The device as defined in claim 3 wherein said power source delivers at least 5 kW to said coil.

31. The device as defined in claim 2, wherein said power source delivers at least 5 kW to said coil.

32. The device as defined in claim 1, wherein said power source delivers at least 5 kW to said coil.

33. The device as defined in claim 32, wherein said coil has a length along said path and said device has a mechanism to control the speed of said electrodes so said electrodes are heated by said coil for a selected residence time.

34. The device as defined in claim 33, including a control mechanism to adjust said residence time.

35. The device as defined in claim 25, wherein said coil has a length along said path and said device has a mechanism to control the speed of said electrodes so said electrodes are heated by said coil for a selected residence time.

36. The device as defined in claim 35, including a control mechanism to adjust said residence time.

37. The device as defined in claim 19, wherein said coil has a length along said path and said device has a mechanism to control the speed of said electrodes so said electrodes are heated by said coil for a selected residence time.

38. The device as defined in claim 37, including a control mechanism to adjust said residence time.

39. The device as defined in claim 15, wherein said coil has a length along said path and said device has a mechanism to control the speed of said electrodes so said electrodes are heated by said coil for a selected residence time.

40. The device as defined in claim 39, including a control mechanism to adjust said residence time.

41. The device as defined in claim 8, wherein said coil has a length along said path and said device has a mechanism to control the speed of said electrodes so said electrodes are heated by said coil for a selected residence time.

42. The device as defined in claim 41, including a control mechanism to adjust said residence time.

43. The device as defined in claim 3 wherein said coil has a length along said path and said device has a mechanism to control the speed of said electrodes so said electrodes are heated by said coil for a selected residence time.

44. The device as defined in claim 43, including a control mechanism to adjust said residence time.

45. The device as defined in claim 2, wherein said coil has a length along said path and said device has a mechanism to control the speed of said electrodes so said electrodes are heated by said coil for a selected residence time.

46. The device as defined in claim 45, including a control mechanism to adjust said residence time.

47. The device as defined in claim 1, wherein said coil has a length along said path and said device has a mechanism to control the speed of said electrodes so said electrodes are heated by said coil for a selected residence time.

48. The device as defined in claim 47, including a control mechanism to adjust said residence time.

49. The device as defined in claim 31, wherein said passageway is generally oval.

50. The device as defined in claim 24, wherein said passageway is generally oval.

51. The device as defined in claim 18, wherein said passageway is generally oval.

52. The device as defined in claim 6, wherein said passageway is generally oval.

53. The device as defined in claim 2, wherein said passageway is generally oval.

54. The device as defined in claim 47, wherein said coil has a different number of effective turns on opposite sides of said path.

55. The device as defined in claim 32, wherein said coil has a different number of effective turns on opposite sides of said path.

56. The device as defined in claim 19, wherein said coil has a different number of effective turns on opposite sides of said path.

57. The device as defined in claim 8, wherein said coil has a different number of effective turns on opposite sides of said path.

58. The device as defined in claim 3 wherein said coil has a different number of effective turns on opposite sides of said path.

59. The device as defined in claim 2, wherein said coil has a different number of effective turns on opposite sides of said path.

60. The device as defined in claim 1, wherein said coil has a different number of effective turns on opposite sides of said path.

61. The device as defined in claim 3 wherein said coating includes metallic particles heatable by induction.

62. The device as defined in claim 61, including a second induction heating coil extending along said path and at least partially coterminous with said wire heating coil, a second power source with an AC output connected to said second coil and delivering an AC current to said second coil to induce heating currents in said particles of said coating for heating said coating with said wire.

63. The device as defined in claim 62, wherein said first mentioned coil and said second coil are driven by different frequencies.

64. The device as defined in claim 1, wherein said coating includes metallic particles heatable by induction.

65. The device as defined in claim 64 including a second induction heating coil extending along said path and at least partially coterminous with said wire heating coil, a second power source with an AC output connected to said second coil and delivering an AC current to said second coil to induce heating currents in said particles of said coating for heating said coating with said wire.

66. The device as defined in claim 65, wherein said first mentioned coil and said second coil are driven by different frequencies.

67. The device as defined in claim 48, including a convection cooling stage after said induction heating coil.

68. The device as defined in claim 32, including a convection cooling stage after said induction heating coil.

69. The device as defined in claim 19, including a convection cooling stage after said induction heating coil.

70. The device as defined in claim 8, including a convection cooling stage after said induction heating coil.

71. The device as defined in claim 3 including a convection cooling stage after said induction heating coil.

72. The device as defined in claim 2, including a convection cooling stage after said induction heating coil.

73. The device as defined in claim 1, including a convection cooling stage after said induction heating coil.

* * * * *